(12) United States Patent
Ogino

(10) Patent No.: US 7,116,028 B2
(45) Date of Patent: Oct. 3, 2006

(54) MOTOR UTILIZING BASIC FACTOR AND HAVING GENERATOR FUNCTION

(76) Inventor: Sanshiro Ogino, Daini Umeda Building, No. 405, 20-1, Futaba 2-chome, Tokyo (JP)

(*) Notice: Subject to any disclaimer, the term of this patent is extended or adjusted under 35 U.S.C. 154(b) by 342 days.

(21) Appl. No.: 10/289,670

(22) Filed: Nov. 7, 2002

(65) Prior Publication Data

US 2003/0094860 A1 May 22, 2003

Related U.S. Application Data

(62) Division of application No. 09/580,258, filed on May 26, 2000, now Pat. No. 6,518,681.

(30) Foreign Application Priority Data

May 28, 1999 (JP) .......................... 11-149289

(51) Int. Cl.
*H02K 41/83* (2006.01)

(52) U.S. Cl. ................................. 310/156.51
(58) Field of Classification Search ............ 310/156.51, 310/12, 181, 152, 184, 14, 254, 49 R; H02K 41/83, H02K 19/04
See application file for complete search history.

(56) References Cited

U.S. PATENT DOCUMENTS

| | | | |
|---|---|---|---|
| 4,064,442 A | | 12/1977 | Garron |
| 4,132,911 A | | 1/1979 | Garron |
| 4,965,695 A | | 10/1990 | Baumann |
| 5,554,903 A | * | 9/1996 | Takara ................... 310/156.01 |
| 5,804,901 A | * | 9/1998 | Ogino et al. ................ 310/152 |
| 5,834,865 A | * | 11/1998 | Sugiura ..................... 310/49 R |
| 6,369,479 B1 | * | 4/2002 | Ochiai et al. .......... 310/156.51 |

FOREIGN PATENT DOCUMENTS

| | | |
|---|---|---|
| EP | 0766271 | 4/1997 |
| EP | 0 838 891 | 4/1998 |
| JP | 53-169651 | 11/1978 |
| JP | 1-502705 | 11/1987 |
| JP | 01-214253 | 8/1989 |
| JP | 1-318538 | 12/1989 |
| JP | 7-046802 | 2/1995 |
| JP | 9-037528 | 2/1997 |
| JP | 9-182409 | 7/1997 |
| JP | 10-066318 | 3/1998 |
| JP | 11-008961 | 1/1999 |
| JP | 11-214217 | 8/1999 |
| JP | 2000-150228 | 5/2000 |
| WO | WO98/05112 | 2/1998 |

OTHER PUBLICATIONS

"Perpetual Motion Machines" by Stanley W. Angrist, Scientific American 218 (Jan. 1968) pp. 115–122.

"Sie dürfen nicht funktionieren, aber warum?" by Von Wolfgang Bürger, 1155 *Technische Rundschau* 82 (1990) 11 Mai, No. 19, Bern, CH, pp. 92–97.

* cited by examiner

*Primary Examiner*—Darren Schuberg
*Assistant Examiner*—Karen Beth Addison
(74) *Attorney, Agent, or Firm*—Collard & Roe, P.C.

(57) ABSTRACT

A motor which has an improved energy efficiency, is excellent in practical use and has a generator function at the same time. The motor is provided with a basic factor 15 having working surfaces 55a and 55c on both sides thereof, respectively, and movable members 57 made of a magnetic material and arranged opposite to the working surfaces, respectively. Further, the basic factor 15 is provided with an electromagnet element 17 and permanent magnets 19 arranged on both sides thereof through contact surfaces, respectively, and the working surfaces and the contact surfaces are held opposite to each other through the permanent magnets 19, respectively.

7 Claims, 11 Drawing Sheets

MOTOR UTILIZING BASIC FACTOR AND HAVING GENERATOR FUNCTION

This is a divisional of application Ser. No. 09/580,258 filed on May 26, 2000 now U.S. Pat. No. 6,518,681.

BACKGROUND OF THE INVENTION

1. Field of the Invention

The present invention relates to rotary type motors or stepping motors which utilize a hybrid type magnet called a basic factor and which are driven by a DC pulsating current.

2. Description of the Related Art

Conventionally, Japanese Unexamined Patent Publication (JP-A) No. H11-214217 (214217/1999) discloses a hybrid type magnet. This hybrid type magnet is called a basic factor and forms a closed magnetic path by an electromagnet formed by winding an exciting coil about the center of a U-shaped member and an engaging member comprising magnetic members arranged on both ends of a permanent magnet. Further, a movable member made of a soft magnetic material is arranged in opposite relationship with the outer surface of the engaging member of the hybrid magnet through an air gap.

Where no electrical current is applied to the exciting coil, a magnetic path or circuit is formed in the hybrid magnet by the line of magnetic force of the permanent magnet so that no attractive force generates on the movable member. On the other hand, when an electrical current is applied through the exciting coil so as to form a magnetic path in a direction reverse to the magnetic line of force of the permanent magnet, the magnetic line of force of the permanent magnet does not form a closed magnetic path within the hybrid magnet but generates an attractive force with respect to the movable member by forming a magnetic path through the air gap.

Further, Japanese Patent Application No. H10-321044 (321044/1998) discloses a motor which uses such a hybrid magnet. This motor is provided with a couple of hybrid magnets arranged horizontally in opposite relationship with each other and a slide member disposed between the hybrid magnets. The slide member comprises a non-magnetic member through which rails pass in a direction normal to the opposing direction of the hybrid magnets and is capable of moving in the direction of the rails by attractive force effected by the hybrid magnets.

However, the motor using the conventional hybrid magnets still has had room for its improvement in practical use from the point of view of its energy efficiency.

Further, if the motor using the conventional hybrid magnet is provided with a function serving as a generator, it will be possible to make more effective use of energy.

SUMMARY OF THE INVENTION

It is a first object of the present invention to provide a motor provided with a basic factor(s) which can be miniaturized, which has an improved energy efficiency and which is excellent in practical use.

It is a second object of the present invention to provide a motor provided with a basic factor(s) and having a power generating function.

It is a third object of the present invention to provide a linear motor formed of a motor provided with the above-described basic factor(s).

It is a fourth object of the present invention to provide a stepping rotary motor formed of a motor having the above-described basic factor(s).

According to one aspect of the invention, there is provided a motor which comprises a basic factor having working surfaces on both sides thereof and attraction members formed of a magnetic material and arranged opposite to the working surfaces so as to be attracted to the working surfaces, respectively. In the aspect of the present invention, the basic factor includes an electromagnet element and permanent magnet elements arranged on both sides of the electromagnet element through contact surfaces, respectively, such that the working surfaces and the contact surfaces are held opposite to each other through the permanent magnet element, respectively.

According to another aspect of the invention, there is provided a motor which has a power generating function and comprises a first drive member having first basic factors arranged about a rotary shaft and having first working surfaces on the outside thereof and first windings at the center thereof, and a second drive member having second basic factors arranged around the first basic factors and having second working surfaces inside thereof and second windings outside thereof. In the aspect of the present invention, the first working surfaces of the first basic factors are held opposite to the second working surfaces of the second basic factors leaving a predetermined gap therebetween at a position to which the first drive member reaches as a result of its single rotation about the rotary shaft of the first drive member. When a DC pulsating current is applied to the first windings of the first basic factors, the first working surfaces apply attractive forces to the second working surfaces, respectively, only for a period of time during which the DC pulsating current is continuously applied so that the first drive member rotates relative to the second drive member and a DC pulsating current generating in the second windings can be derived therefrom.

In the present invention, an attracted substance will be referred to as "an attraction member", which is attracted by magnetic force of the basic factor.

DESCRIPTION OF PREFERRED EMBODIMENTS

First, prior to describing preferred embodiments of the present invention and in order to facilitate the understanding of the present invention, a prior art hybrid type magnet and a motor using such magnet will be described with reference to FIGS. 1 and 2.

Figure 1:
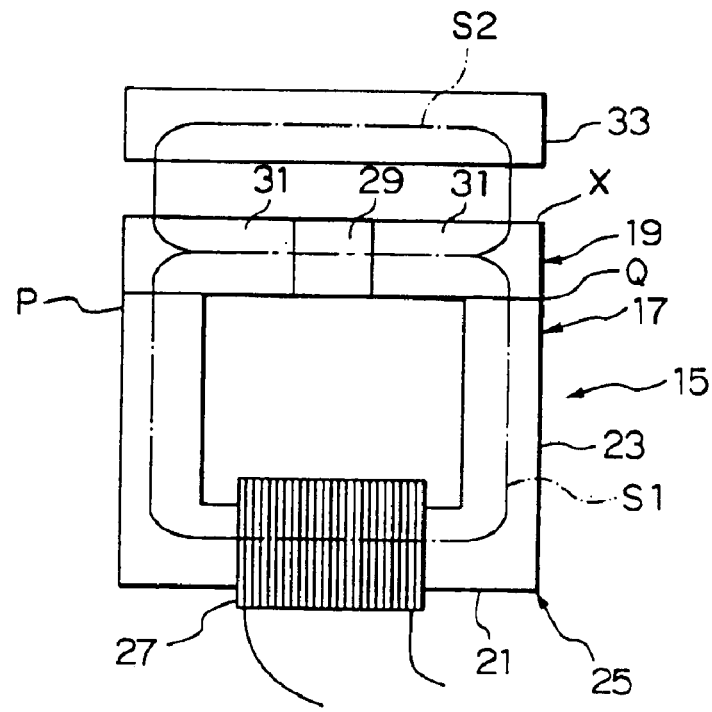
FIG. 1 is a diagram showing a conventional hybrid type magnet.

Referring to FIG. 1, a hybrid type magnet 15 (hereinafter referred to as the "hybrid magnet") disclosed in Japanese Patent Application No. 27884/1998 is also called a basic factor and is provided with an electromagnet element 17 and an engaging member or permanent magnet element 19 closely attached to both ends of the electromagnet element 17, respectively. The electromagnet element 17 comprises a base 21, a yoke 25, and an exiting coil 27. The yoke 25 is made of a U-shaped material and is provided with legs 23 projecting in the same direction from both ends of the base 21. The exciting coil 27 is wound around the base 21 of the yoke 25.

At the same time, the engaging member 19 is provided with a permanent magnet 29 and magnetic members 31 sandwiching both sides of the permanent magnet 29 therebetween.

Now, assuming that in the state shown in FIG. 1, the outer surface of the engaging member 19 of the hybrid magnet 15 be a working surface X and a movable member 33 made of a soft magnetic material 33 come close to the working surface X while connecting surfaces P and Q do not adhere to, or repulse against each other, when an electrical current is applied to the exciting coil 27, the magnetic line of force of the permanent magnet 29 does not constitute a closed magnetic path within the hybrid magnet 15 but goes beyond the connecting surfaces P and Q to constitute a magnetic path with respect to a movable member 33 through an air gap so that a attractive force is generated on the working surface X.

Figure 2:
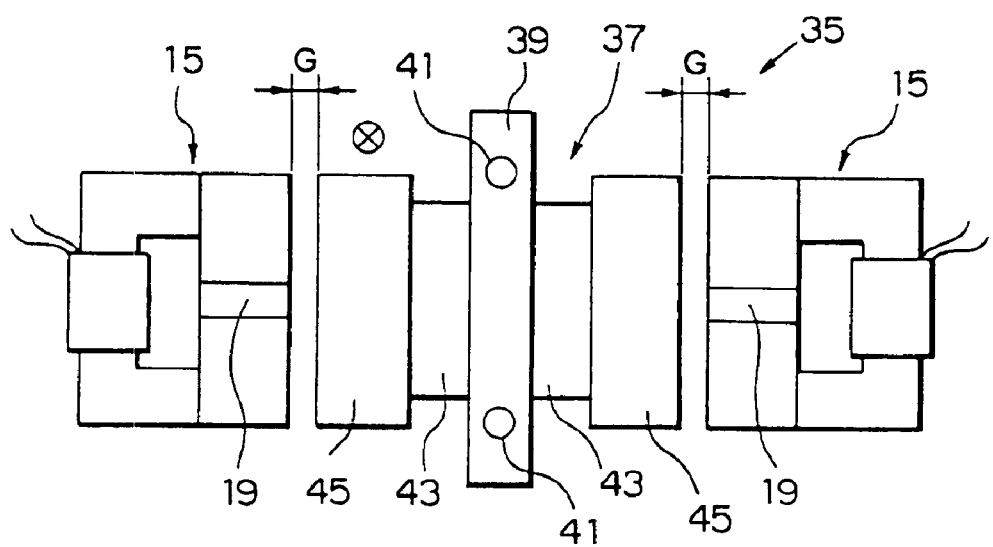
FIG. 2 is a diagram showing one example of a motor using the hybrid type magnet shown in FIG. 1.

Referring to FIG. 2, a motor 35 disclosed in the Japanese Patent Application No. H10-321044 (321044/1998) is provided with a couple of hybrid magnets 15 arranged horizontally in opposite relationship with each other and a slide member 37 arranged between the hybrid magnets 15 capable of sliding vertically with respect to the surface of the drawing. The slide member 37 is provided at the central portion thereof with a square columnar base 39 made of non-magnetic member having upper and lower holes 41, 41 through which rails (not shown) extend, respectively. Further, to both right and left sides of the base 39, there are attached a mounting plate 43 made of non-magnetic member, and there are attached magnetic movable members 45 at both end portion of the mounting plate 43, respectively. Between each of the movable members 45 and the engaging member 19 of the hybrid magnet 15 there is provided a gap G.

In the case of the motor 35 of the above-described structure, the attractive force acting on the magnetic member which is passed by the hybrid magnet 15 is such that the attractive force is larger than when only an electromagnet is used at the same current value and that the energy acting on the slide member 37 becomes larger.

Next, the basic principle of the motor according to the present invention will be described in detail for the purpose of facilitating the understanding of the present invention.

Figure 3A:
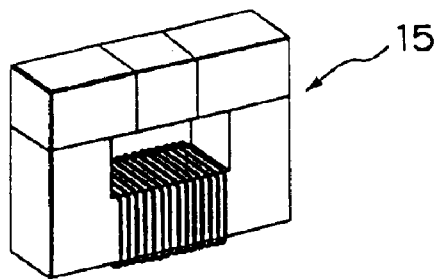
FIG. 3A is a perspective view of a basic factor for use with a motor according to the present invention.
Figure 3B:
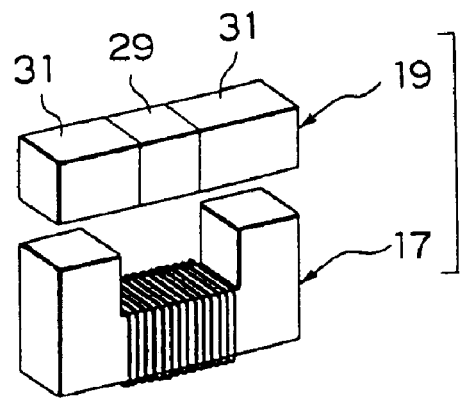
FIG. 3B is an exploded perspective view of the basic factor shown in FIG. 3A.
Figure 3C:
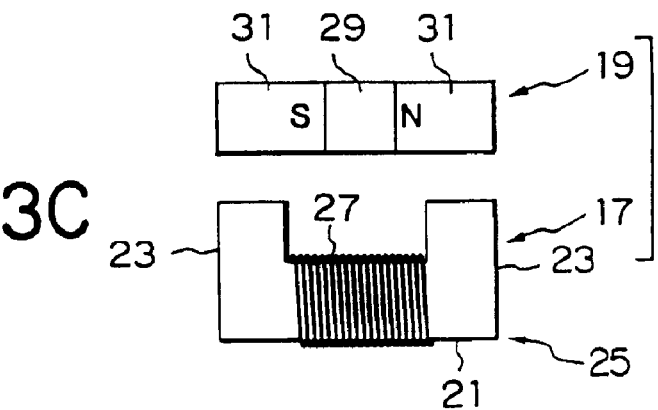
FIG. 3C is a front view of the basic factor shown in FIG. 3A.

FIG. 3A is a perspective view of a basic factor for use in the motor according to the present invention and FIG. 3B is an exploded perspective view of the basic factor shown in FIG. 3A. Further, FIG. 3C is a front view of the basic factor shown in FIG. 3B and FIG. 3D is a front view of the basic factor shown in FIG. 3A.

Referring to FIGS. 3A through 3D, a basic factor 15 is provided with a permanent magnet element 19 and an electromagnet element 17. The permanent magnet element 19 is formed in such a manner that both sides of a hard magnetic body or permanent magnetic body 29, such as a neodymium magnet (Nd—Fe—B), are sandwiched by soft magnetic bodies 31 made of a material, such as pure iron in the direction of magnetization thereof. The basic factor is similar to the hybrid magnet and represented by the same reference numeral.

On the other hand, the electromagnet element 17 includes a base 21, a core or a yoke 25 in the form of a soft magnetic body made of a U-shaped pure iron and having a pair of legs 23 projecting from both ends of the base 21 in the same direction and a coil 27 made of a conductive wire, such as a copper wire with an insulation cover therearound, wound around the base 21 of the core 25.

Figure 3D:
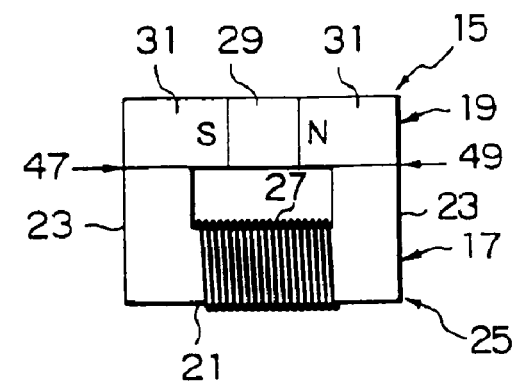
FIG. 3D is a front view of the basic factor shown in FIG. 3B.

As will be shown in its most favorable condition in FIGS. 3A and 3D, between the permanent magnet element 19 and both end faces of the core 25 of the electromagnet element 17, there are formed connecting surfaces 47 and 49 respectively.

Next, the operation principle of the basic factor 15 shown in FIGS. 3A through 3D will be described with reference to FIGS. 4A through 4C.

Figure 4A:
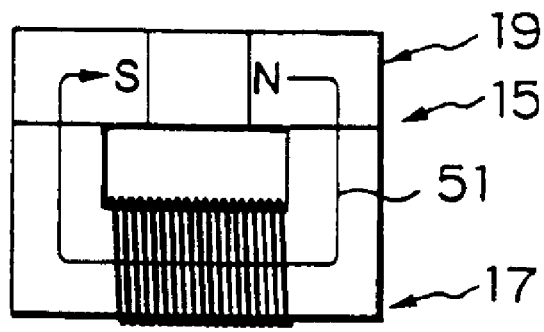
FIGS. 4A through 4C are front views, respectively, of the basic factor shown in FIGS. 3A through 3D with the views being given for illustrating the operation principle of the basic factor shown in FIGS. 3A through 3D.

Referring to FIG. 4A, when the electromagnet element 17 is not energized, the magnetic line of force of the permanent magnet element 19 only goes round along a closed magnetic path of the basic factor 15 as shown by the arrow 51 and almost no magnetic flux leakage into the surrounding air takes place. Accordingly, the connecting surfaces 47 and 49 are firmly adhered to the electromagnet element 17. In this case, the absorbing force of each of the connecting surfaces 47 and 49 is generated by the permanent magnet element 19 and this phenomenon is called herein a first state.

Figure 4B:
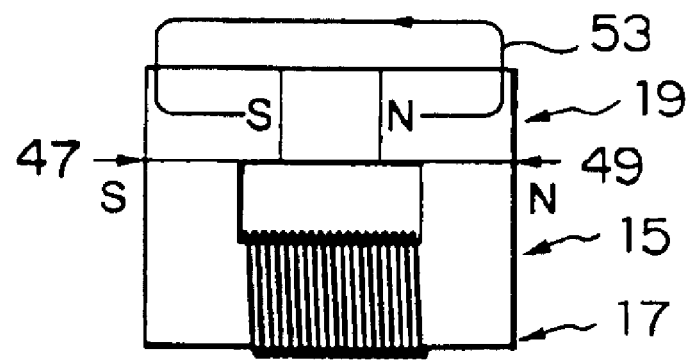

Next, as shown in FIG. 4B, when an electrical current capable of generating a number of magnetic fluxes larger than that of the permanent magnet element 19 is applied to the electromagnet element 17 by causing the same magnetic poles to face each other, the line of magnetic force of the permanent magnet element 19 is pushed back from the closed magnetic path above the connecting surfaces 47 and 49 by the line of magnetic force of the electromagnet element 17 and when it goes beyond the saturated condition of the permanent magnet, it is discharged into the air as indicated by the arrow 53. In this case, if the number of magnetic fluxes of the electromagnet element 17 is sufficiently large, the line of magnetic force to be discharged into the air is a synthesis of that of the permanent magnet element 19 and that of the electromagnet element 17.

Accordingly, the absorbing forces of the connecting surfaces 47 and 49 are considered to have been produced only by the electromagnet element 17. This phenomenon is called a second state.

Figure 4C:
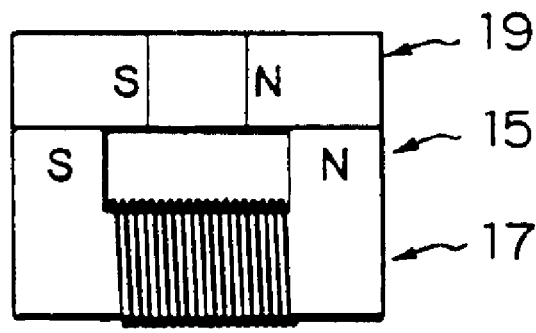

Next, a description will be made of a case in which as shown in FIG. 4C, an electric current capable of generating the number of magnetic fluxes same as that of magnetic fluxes of the permanent magnet element 19 is applied to the electromagnet element 17 by causing the same magnetic poles of the two magnets to face each other and the resultant magnetic flux is below the saturated condition of the residual magnetic flux density of the basic factor 15 itself.

In the above case, the connecting surfaces 47 and 49 are held in an ineffective state in which no attraction nor repulsion take place. This means that the line of magnetic force of the permanent magnet element 19 and that of the electromagnet element 17 do not communicate with each other through the connecting surfaces 47 and 49. It is noted that if the number of magnetic fluxes and that of the electromagnet element 17 exceed the saturated condition of the residual magnetic flux density of the basic factor 15 itself are the same and large, the connecting surfaces 47 and 49 repulse against each other and the line of magnetic force of each of the magnet elements is discharged into the air as a leakage flux. This phenomenon is called a third state.

Figure 5A:
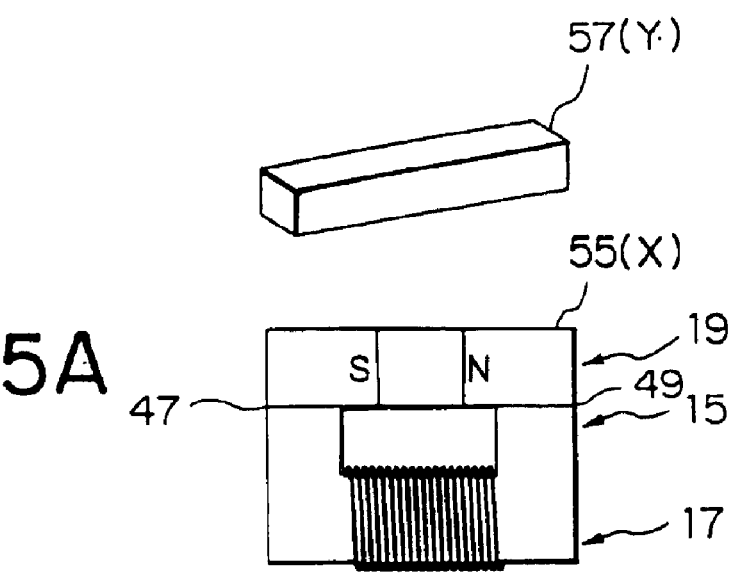
FIGS. 5A through 5C are front views of the basic factor shown in FIGS. 3A through 3D with the views being given for illustrating the operation principle of the basic factor.
Figure 5B:
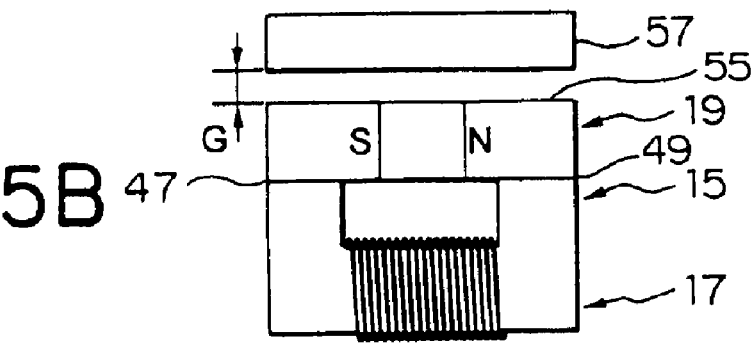
Figure 5C:
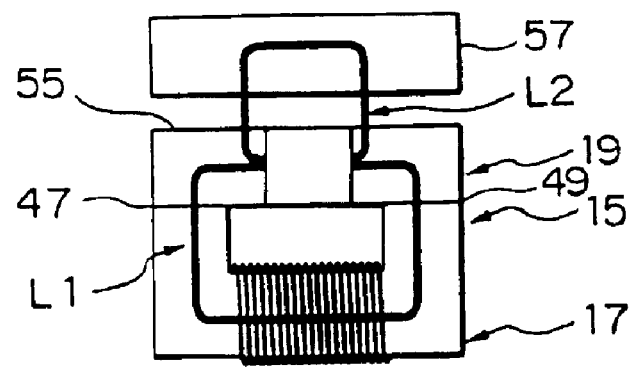

In the above third state, assume that, as shown in FIG. 5, the basic factor 15 have a working surface 55 designated by X and a movable or fixed attraction member (Y) 57 come close to X. Note that the attraction member (Y) 57 is made of a soft magnetic material, such as pure iron.

In the state shown in FIG. 5, assume that the value of electrical current to be applied to the electromagnet element 17 be α, the value of α would become small as the air gap between the basic factor 15 and the attraction member (Y) 57 is reduced in the state in which the contact surfaces 47 and 49 are held ineffective. This means that the line of magnetic force of the permanent magnet element 19 does not constitute a closed magnetic path within the basic factor 15 by going beyond the connecting surfaces 47 and 49 but constitutes a magnetic path through an air gap G between the basic factor 15 and the attraction member (Y) 57 causing a attractive force to generate on the working surface (X) 55. In this case, the amount of the value of α to be applied to the electromagnet element 17 may be sufficient if it can interrupt the line of magnetic force of the permanent magnet element 19 and therefore, the easier the formation of a magnetic path by the permanent magnet element 19 together with the movable member 57 becomes, in other words, the more the attractive force of the working surface (X) 55 increases, the smaller the value of α would become. It should be noted that the attractive force of the working surface (X) is limited by the performance of the permanent magnet as a matter of course. This phenomenon is called a fourth state.

However, like the second state, when a large amount of electrical current is applied to the electromagnet element 17, the attractive force of the working surface (X) 55 can be made strong because it is a synthesis of the line of the magnetic force of the permanent magnet element 19 and that of the line of the magnetic force of the electromagnet element 17 but the efficiency of energy becomes worse.

In the fourth state, the attractive force of the working surface (X) 55 is increased and the value of α reduced under the following three conditions (i)–(iii):

(i) To reduce the size of the air gap G of the working surface (X) 55.

(ii) To make the yoke of the permanent magnet element 19 and the soft magnetic portion of the attraction member (Y) 57 by using a material having a saturation magnetic flux density higher than that of the core or yoke of the electromagnet element.

(iii) To make the length L2 of the magnetic path formed by the permanent magnet element 19 and the attraction member (Y) through an air gap shorter than the length L1 of the closed path within the basic factor 15. By the way, it goes without saying that in order to increase the attractive force on the working surface (X) 55, the performance (Br, BH) of the permanent magnet element 19 itself should be increased. Further, as one of elements for substituting the neodymium magnet, a superconductive magnet may be used.

Where the product is actually designed, if it is assumed that the length(width) of the permanent magnet element 19 itself in the direction of magnetization be L, the length of the permanent magnet element 19 be XL and the sectional area thereof be Z, suitable values for L and XL can be calculated on the bases of a Z, Br and BH curve graph and the coefficient of permeance so that the optimum sizes of the permanent magnet element 19 and the attraction member(Y) 57 can be derived therefrom. Therefore, the electromagnet element 17 suitable for this permanent magnet element 19 may well be designed in consideration of the above-described first through fourth states.

In the structure comprising a combination of the basic factor and the attraction member (Y) 57 according to the present invention, the air gap, materials, the length of the magnetic path, sectional area, volume, coil diameter and the like employed therein are made the same as those employed in the structure comprising a combination of the electromagnet element 19 and the attraction member 57 for comparison purposes.

As a result of comparison between the structure according to the present invention and the structure as a comparison example comprising the electromagnet element 17 and the attraction member 57 without the provision of the permanent magnet element 19, it has been found that the electrical energy (W) required for the structure of the present invention is less than one-third through one-fourth of that which is required for the comparison example having no permanent magnet element 19 when the attractive force of each of the working surfaces is the same between the two.

Further, when we suppose a reluctance motor to which the structure of the above-described comparison example is applied, the energy conversion efficiency thereof will be about 30%. However, if a reluctance motor utilizing the structure of the present invention requires an electrical energy of less than 30% as compared to the structure of the comparison example, an output exceeding the electrical input can be estimated and this fact shows that the energy of the permanent magnet element is being converted into a dynamic energy corresponding thereto.

Now, the preferred embodiments of the present invention will be described by referring to FIGS. 6 through 13.

Figure 6:
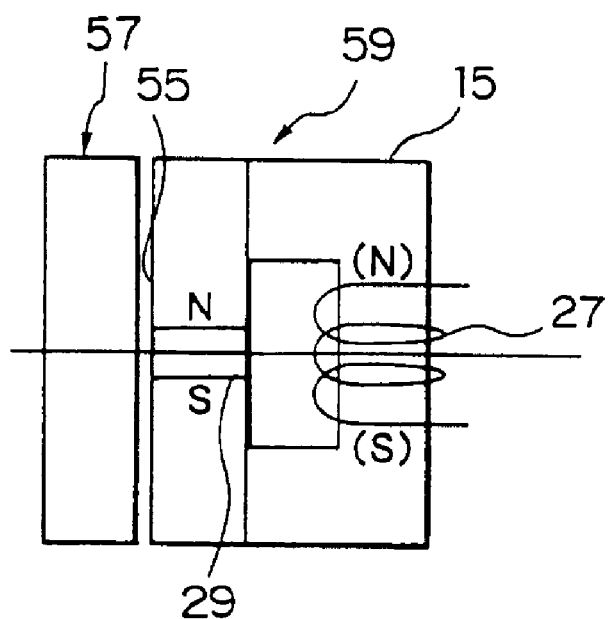
FIG. 6 is a diagram showing a basic structure of a motor using a basic factor according to a first embodiment of the present invention.

Referring to FIG. 6, a basic structure 59 of a motor using a basic factor according to a first embodiment of the present invention is such that the attraction member 57 is arranged close to one end of the basic factor 15. In this arrangement, when an input value α is applied to an exciting coil 27, the attraction member 57 is made to have a attractive force.

Figure 7:
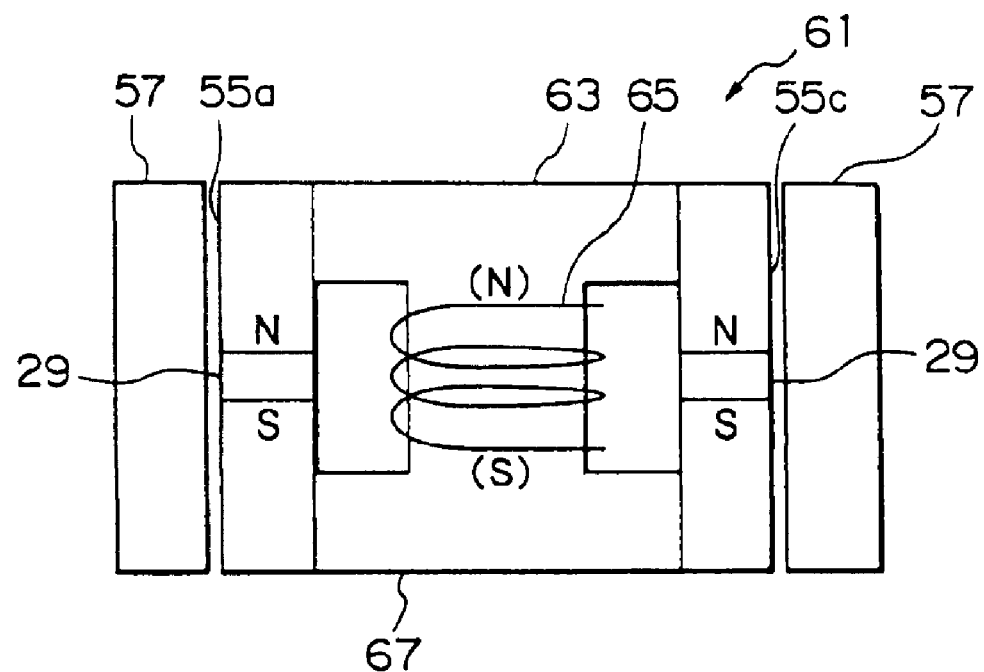
FIG. 7 is a side view of a motor having the basic structure of the motor shown in FIG. 6.

Referring to FIG. 7, the motor having the basic structure shown in FIG. 6 is provided with a basic factor 67 comprising a copper winding 65 wound around a core 63 in the shape of H in section and working surfaces(X) 55a and 55c on both right and left sides thereof. Further, the attraction members 57 are provided outside the working surfaces 55a and 55c, in opposite relationships with each other, respectively. This structure has the advantage that the attractive force becomes two times that of the structure with one attraction member shown in FIG. 6 because of the provision of the two attraction members 57, 57.

Figure 8A:
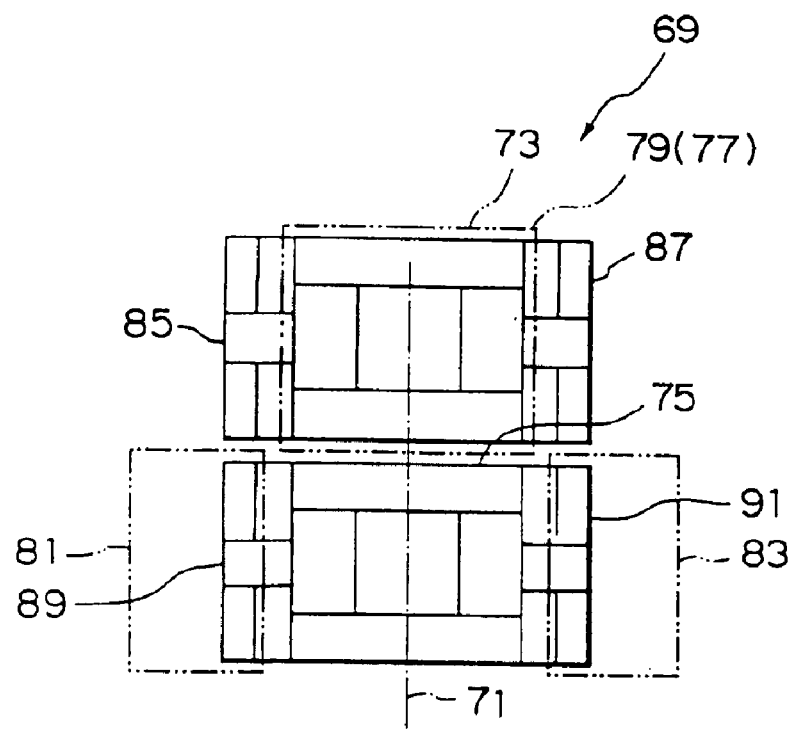
FIG. 8A is a plan view of a rotary motor having the basic structure shown in FIG. 7.

Referring to FIG. 8A, a rotary motor 69 having the basic structure shown in FIG. 6 is provided with two upper and lower basic factors 73 and 75 arranged vertically along a common axis 71 so as to have working surfaces on both sides thereof, respectively. Further, outside the upper basic factor 73 there are arranged attraction members or movable members 77 and 79 in opposite relationship with each other and outside the lower basic factor 75 there are arranged attraction members 81 and 83 in opposite relationship with each other so as to intersect at right angles with the opposing direction of the attraction members 77 and 79.

Next, the operation of the rotary motor 69 having the above-described structure will be described.

Figure 8B:
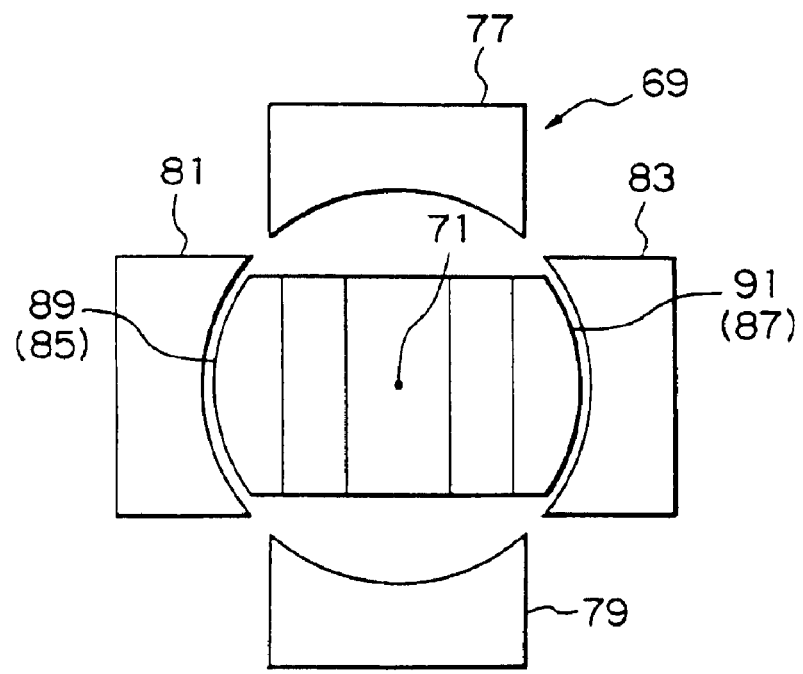
FIG. 8B is a side view of the rotary motor shown in FIG. 8A.

First, in the state shown in FIG. 8B, when a DC pulsating current is applied to the winding (not shown) of the basic factor 73, attractive forces are generated between a working surface 85 and the attraction member 81 and between a working surface 87 and the attraction member 83, respectively, and the basic factor 73 rotates about the central axis 71 by an angle of about 90 degrees until the working surfaces 85 and 87 come to lie opposite to the attraction members 81 and 83, respectively.

Next, at the position at which the basic factor 73 has rotated, the pulsating current goes OFF so that the attractive forces on the working surfaces 85 and 87 become zero and the basic factor 73 rotates by inertia in such a manner that the working surfaces 85 and 87 pass the opposing position of the attraction members 81 and 83. Next, when the basic factor 75 is operated by the application of a DC pulsating current to the winding (not shown) of the basic factor 75, attractive forces generate between the working surface 89 and the attraction member 79 and between the working surface 87 and the attraction member 77, respectively, so that the basic factor 75 rotates further about the central axis by an angle of 90 degrees. Thus, when the working surface 89 and the attraction member 79 and a working surface 91 and the attraction member 77 are held opposite to each other, respectively, the pulsating current goes OFF so that the basic factor 75 rotates further by some degree with inertia beyond the opposing position of the working surface 89 and the attraction member 79 and that of the working surface 91 and the attraction member 77.

Similarly, when a DC pulsating current having a predetermined pulse width is applied to the windings of the basic factors 73 and 75 in an alternative fashion, it is possible to constitute a DC stepping motor having a rotor comprising the two connected basic factors 73 and 75 and rotatable about a central axis.

It should be noted that the basic factors 73 and 75 can be fixed and the attraction members 77, 79, 81 and 83 can be made rotatable.

Figure 9:
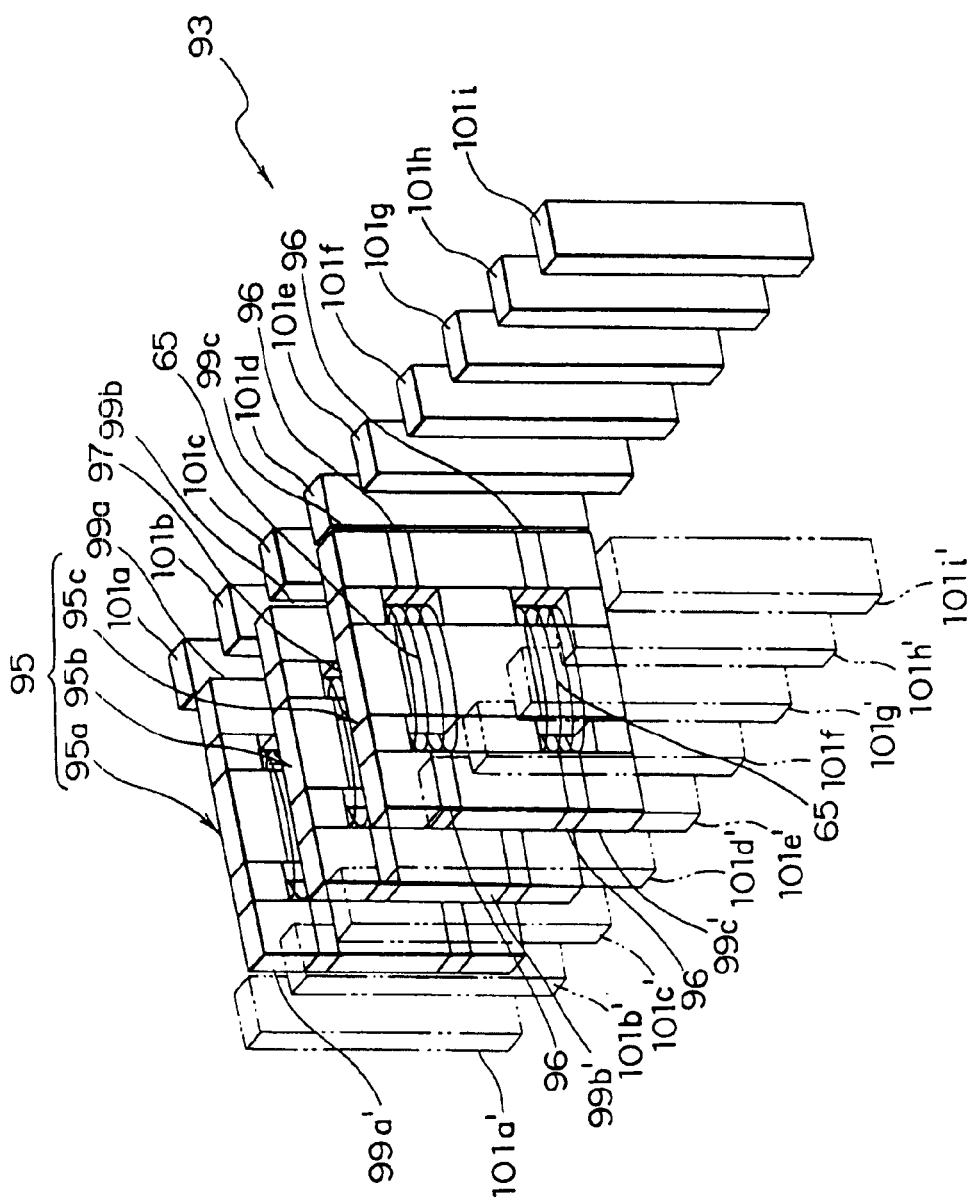
FIG. 9 is a perspective view of a structure of a linear motor according to a second embodiment of the present invention.

Referring to FIG. 9, a linear motor 93 according to a second embodiment of the present invention employs the structure shown in FIG. 7 and is constructed such that each of basic factors 95a, 95b and 95c having the same shape comprises a core 97 formed by connecting a couple of H-shaped cores side to side, a copper winding 65 wound around the core 97, and combined permanent magnet elements with working surfaces 99a and 99a' (99b and 99b' and 99c and 99c') formed on both sides thereof. Such a combined permanent magnet element of FIG. 9 is formed by a combination of a pair of permanent magnet elements (FIG. 7) in series. Each of the permanent magnet elements has a permanent magnetic body 96 corresponding to a copper winding 95 and two soft magnetic bodies sandwiching the permanent magnetic body. These basic factors 95a, 95b and 95c are arranged in series leaving a predetermined interval (hereinafter referred to as the "first interval") thereamong thereby forming a central member 95 serving as a movable element. Further, outside the working surfaces 95a and 95a', 95b and 95b' and 95c and 95c' of the central member 95 there are arranged, in series, attraction members 101a through 101i serving as a stator leaving a predetermined interval (hereinafter referred to as the "second interval") so as to have side surfaces facing the above-mentioned working surfaces, respectively.

Further, the arrangement pitch of the attraction members 101a through 101i is made smaller than that of the basic factors 95a, 95b and 95c. That is, the first interval is larger than the second interval.

Next, the operation of the linear motor shown in FIG. 9 will be described.

Referring to FIG. 9, the linear motor 93 operates such that when a DC pulsating current having a predetermined pulse width is applied to each of the coils 65 of the basic factor 95b, a attractive force is effected between each of the working surfaces 99b and 99b' of the basic factor 95b and each of the attraction members 101c and 101c' and the central member 95 moves toward this side, that is, toward the direction in which the basic factors 95a, 95b and 96c are overlapped. Thus, in this moving direction of the central member 95, the basic factor 95b comes to a position at which the working surfaces 99c and 99c' of the basic factor 95c are held opposite to the attraction members 101d and 101d', respectively. In this state, the pulsating current applied to the winding 65 of the basic factor 95c goes OFF. However, at this position of the basic factor 95b, the positional relationship between the basic factor 95a and the attraction member 101b becomes the same as the positional relationship between the basic factor 95b before its movement and the attraction members 101c and 101c' shown in FIG. 9, so that when a pulsating current having the same pulse width as the pulsating current applied to the winding 65 of the basic factor 95c is applied to the winding 65 of the basic factor 95a, the basic factor 95a, that is, the central member 95, moves to the position at which the working surfaces 95a and 95a' of the basic factor 95a are held opposite to the attraction members 101b and 101b', respectively. In this case, the pulsating current applied to the basic factor 95a goes OFF at the above-described position of the central member 95. Further, when the basic factor 95a comes to the position of the attraction member 101a, the positional relationship between the basic factor 95c and the attraction members 101e and 101e' is the same as the positional relationship between the basic factor 95b before its movement in FIG. 9 and the attraction members 101c and 101c' so that the same DC pulsating current is applied to the basic factor 95a. Further, the working surfaces 99c and 99c' of the basic factor 95c come to line opposite to the attraction members 101e and 101e', respectively, that is, to the same position in the overlapping direction of the basic factors, the DC pulsating current goes OFF and the above-described operations are repeated. That is, by repeatedly applying the same DC pulsating current having the same pulse width to the windings of the basic factors 95b→95a→95c→95b→95a→95c in that order, the central member 95 moves gradually along the overlapping direction of the attraction members 101a through 101i . . . 101a' through 101i', that is, in FIG. 9, from the upper left portion toward the lower right portion in accordance with the pulse width and time interval of the applied DC pulsating current.

It should be noted that with respect to the linear motor 93 shown in FIG. 9, the structure was described above in which the central member 95 is made movable while the attraction members 101a through 101i . . . 101a' through 101i' are held stationary but it is also possible to make the central member stationary and to make the attraction members movable gradually.

Referring to FIGS. 10, 11A, 11B and 11C, a rotary motor 103 according to a third embodiment of the present invention makes use of the basic structure of the motor shown in FIG. 6. The rotary motor 103 is provided with three basic factors 73, 75 and 105 arranged in series along a central axis 71. A core 109 includes four pairs of upper and lower magnetic legs arranged radially at equal pitch of 90 degrees about the central axis 71 so as to form a cross and a permanent magnet element 19 is connected to each of the pairs of magnetic legs of the core 109.

Consequently, each of the basic factors 73, 75 and 105 is provided with a total of four working surfaces 55a, 55b, 55c and 55d spaced equally by 90 degrees along the circumference about the central axis 71.

Accordingly, each of the basic factors 73, 75 and 105 can generate therearound an output of four times that of the basic factor shown in FIG. 6 by the application thereto of the same input value as in the cases of the basic factors shown in FIGS. 7, 8A and 8B.

Figure 10:
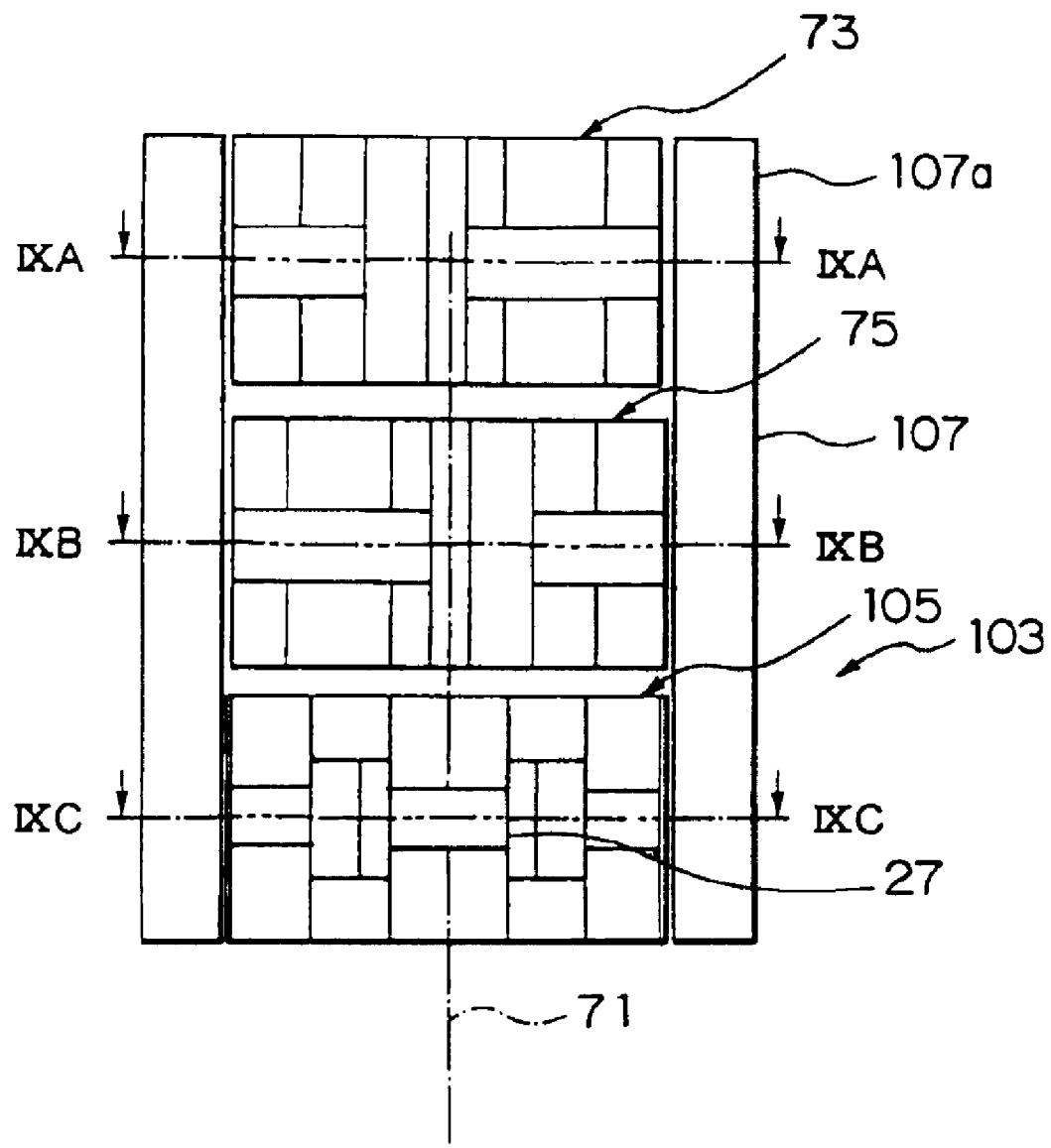
FIG. 10 is a plan view of a rotary motor according to a third embodiment of the present invention.

As shown in FIG. 10, each of the basic factors 73, 75 and 105 has four working surfaces 55a, 55b, 55c and 55d which are arranged about the central shaft 71 in such a manner that they are shifted from one another by 30 degrees in the clockwise direction.

Now, the operation of the motor 103 will be described by referring to FIGS. 11A, 11B and 11C.

Figure 11A:
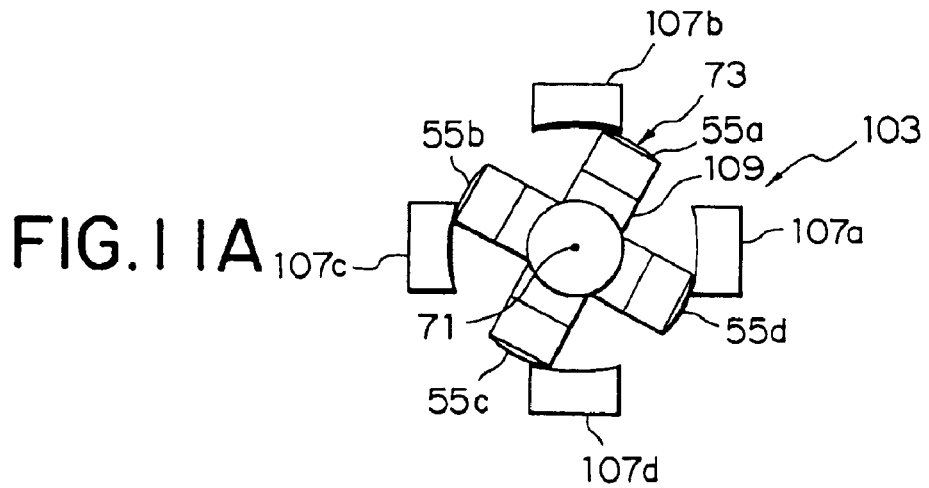
FIGS. 11A through 11C are sectional views taken along the XIA—XIA line, XIB—XIB line and XIC—XIC line, respectively.
Figure 11B:
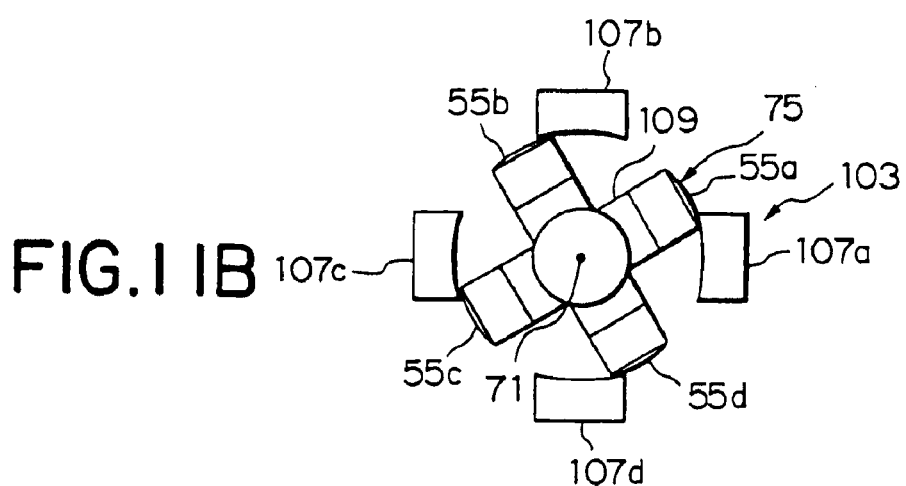
Figure 11C:
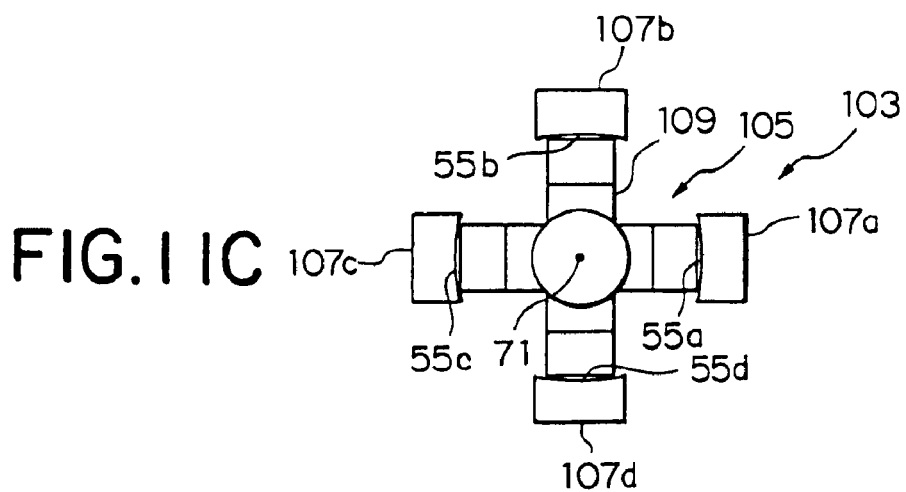

At the position shown in FIG. 11B, when a DC pulsating current having a predetermined pulse width is applied to the windings (not shown) of the basic factor 75, a attractive force is generated between each of the working surfaces 55a through 55d and each of the attraction members 107a through 107d and the working surfaces are rotated by 30 degrees in the clockwise direction so that they are held in the same positional relationship as that shown in FIG. 11C and at this point of time, the DC pulsating current goes OFF to make the attractive force of each of the working surfaces 55a through 55d zero.

Next, at the above-described point, the working surfaces and the attraction members of the basic factor 73 shown in FIG. 11A are held in the same positional relationship as that between the working surfaces and the attraction members of the basic factor 75 shown in FIG. 11b so that when the same DC pulsating current is applied to the windings (not shown) of the basic factor 73, a attractive force is generated between each of the working surfaces 55a through 55d and each of the attraction members 107a through 107d and the working surfaces and the attraction members of the basic factor 73 are held in the same positional relationship as that between the working surfaces and the attraction members of the basic factor 105 shown in FIG. 11C. In this case, the basic factor 105 actually takes a position to which it has rotated clockwise by 90 degrees from its position shown in FIG. 11B.

Similarly, when a DC pulsating current is applied to the windings (not shown) of the basic factor 105, a attractive force is generated between each of the working surfaces 55a through 55d and each of the attraction members 107d, 107a through 107d so that the basic factor 105 takes a position to which it has rotated by 90 degrees from its position shown in FIG. 11C.

Thus, in the above-described manner, when a DC pulsating current is applied to the windings of the basic factors 75→73→105→75→73→105 for a predetermined period of time (i.e., pulse width) at equal intervals, these basic factors rotate in the clockwise direction by 30 degrees every time when the DC pulsating current is applied.

In the above-described third embodiment of the present invention, a description has been made in which the attraction members 107a through 107d serve as a fixed stator and the three basic factors 73, 75 and 105 serve as a rotor, it is also possible to make these attraction members serve as a rotor and to made these basic factors serve as fixed stators to thereby construct a rotary type stepping motor.

Figure 12:
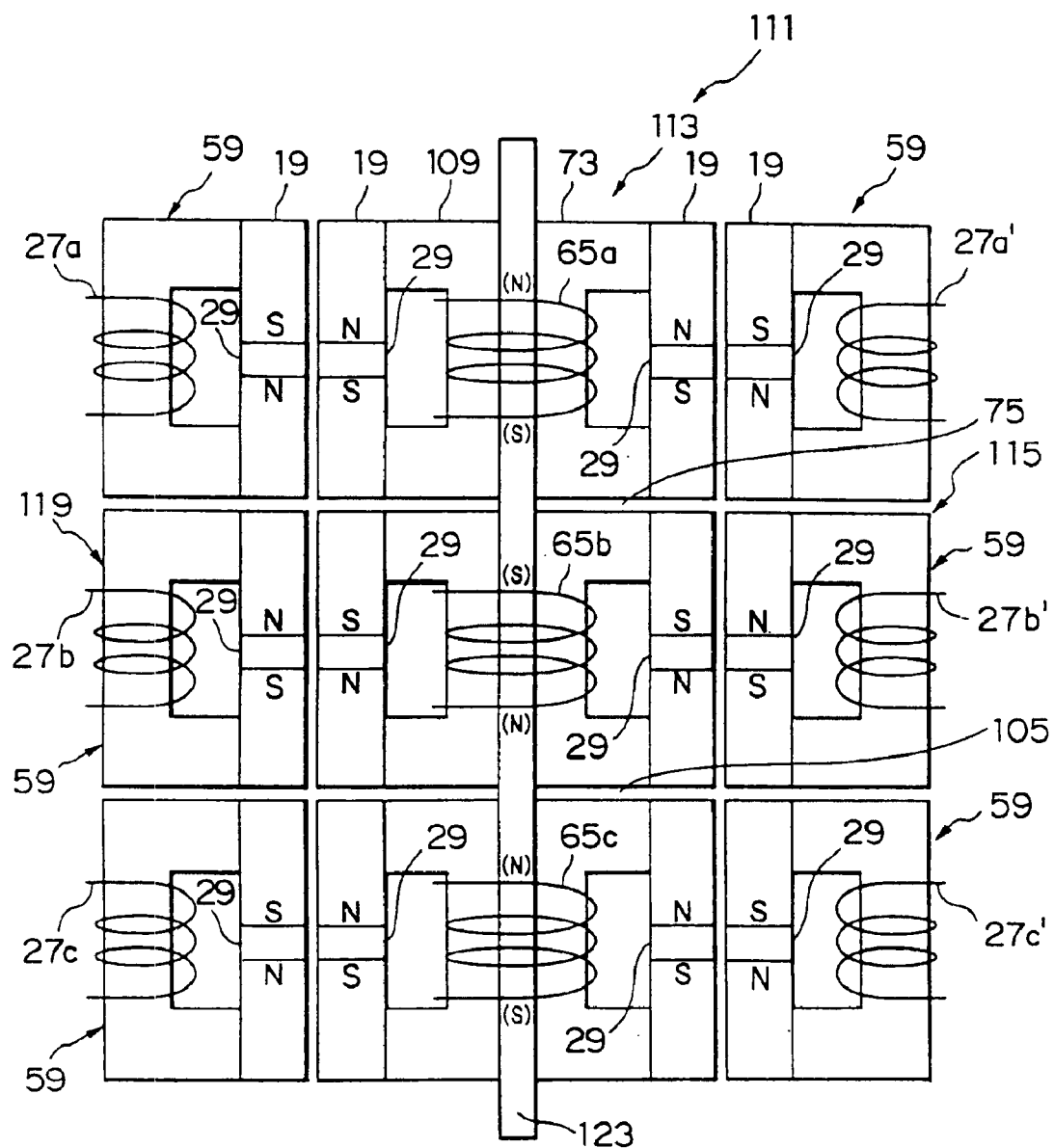
FIG. 12 is a side view of a rotary motor using basic factors according to a fourth embodiment of the present invention.
Figure 13:
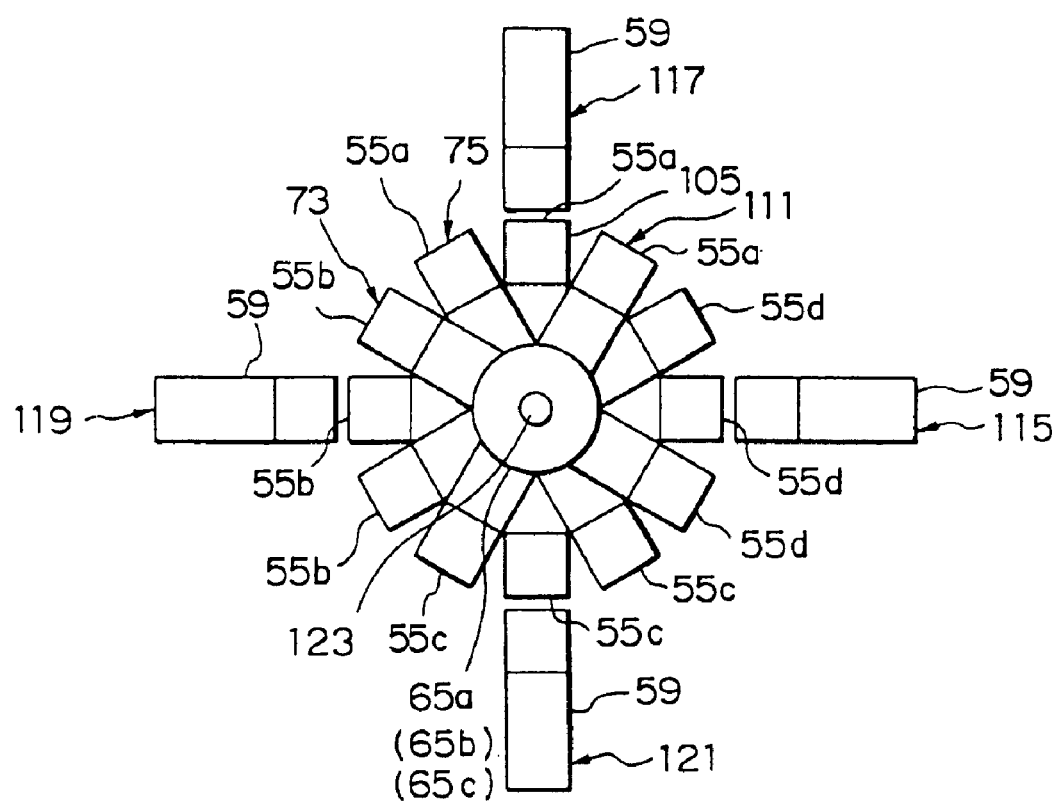
FIG. 13 is a sectional view of the rotary motor shown in FIG. 12.

Referring to FIGS. 12 and 13, a rotary motor 113 according to a fourth embodiment of the present invention is a motor using basic factors and having a power generating function. The rotary motor 113 is provided with a rotor 111 as a first drive member formed by three basic factors 73, 75 and 105 arranged in series about a rotary shaft 123 . Further, each of the basic factors 73, 75 and 105 is provided with four working surfaces 55a, 55b, 55c and 55d and three windings 65a, 65b and 65c. The four working surfaces 55a, 55b, 55c and 55d are so formed that they are shifted from one another by 30 degrees. Further, outside the four equally-divided positions along a circle formed by the working surfaces 55a, 55b, 55c and 55d there are provided four basic factors, respectively, in three series with their working surfaces 55 being kept facing inside thereby forming stators 115, 117, 119 and 121 serving as a second drive member.

In this case, since no electric current is applied to the coils of the four basic factors 59 serving as stators 115, 117, 119 and 121, these basic factors can perform the same function as the attraction members as described with reference to the third embodiment of the present invention.

Further, in the same manner as described with reference to FIG. 10, in FIG. 12, when a DC pulsating current is applied to the first, second and third coils 65a, 65b and 65c of each of the basic factors 73, 75 and 105 of the rotor 111 in the order of the basic factors 75→73→105→75→73→105 in sequence, the coils are excited and the rotor 111 located inside rotates by 30 degrees every time of application of the DC pulsating current.

However, the rotary motor according to the fourth embodiment differs from that according to the third embodiment in that in the case of the former, at the moment when the pulsating current applied to the first coil 65a goes OFF, the magnetic fluxes formed by the permanent magnet elements 29 are separated from each other to change their paths to run toward the closed paths formed by the cores of the permanent magnets. Consequently, the magnetic flux by the permanent magnet elements 29 and the first coil 27a and the magnetic flux formed by the permanent magnet elements 29 and the first coil 27a' are crossed to generate power so that an output is obtained from each of the first coils 27a and 27a'.

Similarly, the rotary motor according to the fourth embodiment differs from the rotary motor shown in FIGS. 10 and 11 in the point that at the moment when the pulsating current applied to the second coil 65b goes OFF and at the moment when the pulsating current applied to the third coil 65c goes OFF, an output is obtained from each of the second coils 27b and 27b' and an output is obtained from each of the third coils 27c and 27c'.

Accordingly, when the rotor 111 is rotated, an output is obtained from the central shaft 127 and at the same time, a surplus output is obtained from each the coils 27a, 27a', 27b, 27b', 27c and 27c' of the stators 115, 117, 119 and 121, respectively. That is, the rotary motor 113 has a power generating function.

In the case of the rotary motor 113 according to the fourth embodiment having the above-described structure, if the motor is so constructed that the output from each of the coils 27a, 27a', 27b, 27b', 27c and 27c' is inputted again to the first, second and third coils 65a, 65b and 65c, the energy efficiency of the motor can be increased.

As described above, according to the present invention, it is possible to provide a stepping motor using a basic factor which has an improved energy efficiency and which is excellent in practical use.

Further, it is possible with the present invention to provide a stepping motor using a basic factor and having the function of a generator at the same time.

Still further, it is possible with the present invention to provide a linear motor in the form of a motor using the above-described basic factor.

In addition, it is possible with the present invention to provide a stepping rotary motor in the form of a motor using the above-described basic factor.

What is claimed is:

1. A motor using basic factors and having a generator function, which comprises a first drive member having first basic factors each provided with first working surfaces outside thereof and first windings at the center thereof, and a second drive member having second basic factors each provided with second working surfaces inside thereof and second windings outside thereof, each of said first working surfaces being held opposite to each of said second working surfaces leaving a predetermined interval from each other at a position at which said first drive member arrives as a result of its single rotation about said rotary shaft, said first basic factor comprising a first electromagnet element and first permanent magnet elements arranged on both sides of said first electromagnet element through contact surfaces, respectively, said first electromagnet element comprising a first magnetic core having an H-shaped section and a first coil wound around the magnetic core, said first permanent magnetic element being provided at both end portions of said H-shaped section and comprising first permanent magnets and first magnetic members sandwiching each of said first permanent magnets therebetween, said first permanent magnet having a length shorter than a distance between said end portion of said H-shaped section, said first working surfaces and the said contact surfaces being held opposite to each other through said permanent magnet element on both sides of said first electromagnet element, said second basic factor comprising a second electromagnet element and second permanent magnet elements arranged on a side of said second electromagnet element through contact surfaces, respectively, said second electromagnet element comprising a second magnetic core having an C-shaped section and a second coil wound around the second magnetic core, said second permanent magnet element being provided at both end portions of said C-shaped section and comprising a second permanent magnet and second magnetic members sandwiching said second permanent magnet therebetween, said second permanent magnet having a length shorter than a distance between said end portion of said C-shaped section, said second working surfaces and said second contact surfaces being held opposite to each other through said first permanent magnet element on both side of said electromagnet element, when a DC pulsating current is applied, it is applied to said first windings for a consecutive period of time, said first working surfaces applying a attractive force to said second working surfaces only for that consecutive period of time so that said first drive member rotates relative to said second drive member and a DC pulsating current generating in said second windings is derived therefrom.

2. The motor as claimed in claim 1, wherein said first and second basic factors are arranged in a plurality of series in the direction of said rotary shaft with the central axes thereof being held coincident with one another.

3. The motor as claimed in claim 1, wherein each of said first basic factors is provided with a pair of working surfaces arranged symmetrically with each other with respect to said rotary shaft.

4. The motor as claimed in claim 3, wherein each of said first basic factors has its first working surfaces at equally divided angular positions, respectively, along a circle about said rotary shaft.

5. The motor as claimed in claim 4, wherein said first basic factors are arranged in series along said rotary shaft with their central axes coinciding with one another, each of said first basic factors having four first working surfaces which are respectively arranged at equally-divided (90°) angular positions along a circle about said rotary shaft, said second basic factors being in series along said rotary shaft at a plurality of equally-divided angular positions along a circle about said rotary shaft at which said second working surfaces are arranged with the number of said second basic factors being the same as that of said first basic factors.

6. The motor as claimed in claim 5, wherein said first basic factors are three in number, the first working surfaces of the adjoining first basic factors being arranged at equally-divided 30° angular positions, respectively, along a circle about said rotary shaft and wherein said adjoining second basic factors are arranged at equally-divided 90° angular positions, respectively, along a circle about said rotary shaft.

7. The motor as claimed in claim 1, wherein said first drive member is a rotor, said second drive member being a stator.

* * * * *